United States Patent
Messersmith et al.

(10) Patent No.: US 9,518,570 B2
(45) Date of Patent: Dec. 13, 2016

(54) MOTOR WINDING HEATER SYSTEMS AND METHODS

(75) Inventors: David Messersmith, Kenosha, WI (US); Andrew Jaap, Sheboygan Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/445,673

(22) Filed: Apr. 12, 2012

(65) Prior Publication Data

US 2013/0271060 A1    Oct. 17, 2013

(51) Int. Cl.
| H02P 23/00 | (2016.01) |
| F04B 17/00 | (2006.01) |
| H02P 29/00 | (2016.01) |
| F04B 49/06 | (2006.01) |
| H02K 15/12 | (2006.01) |

(52) U.S. Cl.
CPC ............. *F04B 17/00* (2013.01); *F04B 49/065* (2013.01); *H02K 15/125* (2013.01); *H02P 29/005* (2013.01); *H02P 2207/01* (2013.01)

(58) Field of Classification Search
USPC ........... 318/727, 126, 400.41, 716, 724, 753
See application file for complete search history.

(56) References Cited

U.S. PATENT DOCUMENTS

| 3,582,712 A | 6/1971 | Blair |
| 5,708,336 A | 1/1998 | Eyerly et al. |
| 2007/0114965 A1* | 5/2007 | Kutsuna ............. B60L 11/1803 318/807 |
| 2009/0058351 A1 | 3/2009 | Messersmith et al. |
| 2010/0156338 A1* | 6/2010 | Lu ....................... H02P 29/0055 318/798 |
| 2010/0162742 A1* | 7/2010 | Shimoda ................. F25B 13/00 62/238.6 |
| 2011/0102012 A1 | 5/2011 | Messersmith et al. |
| 2011/0291596 A1 | 12/2011 | Lu et al. |

OTHER PUBLICATIONS

"Motor Winding Heater—Series B." Product Data Sheet, Jan. 1986. Allen-Bradley Industrial Control Division. pp. 1-4.

* cited by examiner

*Primary Examiner* — Eduardo Colon Santana
*Assistant Examiner* — Iftekhar Mustafa
(74) *Attorney, Agent, or Firm* — Quarles & Brady LLP

(57) ABSTRACT

A motor controller includes a motor winding heater function. The motor controller applies a predefined current to one or more of the motor windings without the use of additional dedicated motor winding heater devices. The motor controller serves to control the operation of the motor, while the motor windings serve both as a heater at times and to produce torque at times.

15 Claims, 5 Drawing Sheets

MOTOR WINDING HEATER SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter disclosed herein relates generally to motor heaters, and, more particularly, to a motor controller having a power structure controllable to heat motor windings.

The use of induction motors for driving equipment, such as oil pumps, irrigation pumps, and the like, has presented certain problems when used in areas where humidity is present. Generally these motors may be operated for long periods of time and become hot, and then are turned off for given periods according to the particular application. When these industrial-type motors are turned off, moisture from the surrounding atmosphere tends to condense within the motor as the motor cools. This moisture can be very harmful to the motor windings and many efforts have been made to help eliminate the moisture condensation. For example, space heaters and other types of radiant heaters have been employed to maintain the temperature of the motor an order of 5 degrees to 20 degrees Celsius above the normal ambient temperature so that condensation will not form after the motor has been turned off. However, interior portions of the motor are not always maintained at such an elevated temperature so that condensation nevertheless can form on internal motor parts.

An improved concept has been the use of a dedicated motor winding heater device to apply a small current, considerably less than the rated amperage of the motor, fed into the electrical input leads of the motor after the motor has been turned off. This small current is intended to keep the interior of the motor at an elevated temperature and thus reduce the problem of condensation. However, such dedicated devices can be somewhat complicated, and add cost and size to the system. First, the dedicated motor winding heater device must be connected across the input electrical leads of the motor and it is possible that the heating unit itself may be damaged if the normal input power to the motor should be applied to these leads inadvertently. In addition, it is necessary that the motor be switched off before the application of any heating current to the interior of the motor from the unit as otherwise there can be generated a back voltage when the motor is still in motion which could damage the unit.

There is a need, therefore, for an improved technique for heating motor windings. There is a particular need for a motor winding heater configuration that does not require the use of additional independent motor winding heater devices.

BRIEF DESCRIPTION OF THE INVENTION

The present embodiments overcomes the aforementioned problems by providing a motor winding heater configuration that eliminates the need for typical dedicated heating elements or devices used to heat motor windings. Accordingly, embodiments of the present invention include a smart motor controller (SMC) system that is configured to apply a current to one or more of the motor windings without the use of additional dedicated motor winding heater devices. The SMC serves to control the operation of the motor, while the motor windings serve both as a heater at times and to produce torque at times.

In applications where an SMC is used to control the motor, the SMC's power structure can be used to heat the motor windings directly. By applying an SMC controlled current level for a controlled time period, the desired level of heating can be controlled. This eliminates the need to provide an independent motor winding heater and thus can save operating costs and panel space for the user.

In accordance with one embodiment of the invention, a motor winding heater includes a motor controller configured to receive an alternating current (AC) power and transmit at least a portion of the AC power during a conduction interval of a cycle of the AC power to a motor, the motor including a motor winding. The motor controller includes a processor configured to control operation of the motor controller in a first operation mode and a second operation mode, where the first operation mode operates to transmit the at least a portion of the AC power to the motor to cause the motor to rotate, and the second operation mode operates to transmit the at least a portion of the AC power to the motor to heat the motor winding without causing the motor to rotate.

In accordance with another embodiment of the invention, a motor controller includes a processor configured to control operation of the motor controller to rotate a motor. When not rotating the motor, the processor is configured to control operation of the motor controller to heat the motor. When the processor controls operation of the motor controller to rotate the motor, the processor controls operation of the motor controller to transmit a first AC power to the motor having a magnitude sufficient to cause the motor to rotate, and when the processor controls operation of the motor controller to heat the motor, the processor controls operation of the motor controller to transmit a second AC power to the motor having a level less than the first AC power, such that the second AC power is sufficient to heat the motor. An input to the motor controller controls at least one of the level of the AC power to the motor and the duration of AC power to the motor.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

Embodiments of the invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., digital signal processing elements, logic elements, diodes, etc., which may carry out a variety of functions under the control of one or more microprocessors or other control devices. Other embodiments may employ program code, or code in combination with other circuit components.

As discussed in detail below, embodiments of the present invention function to provide a smart motor controller (SMC) adapted to control the operation of an induction motor, while at the same time, the SMC is adapted to control the heating of the motor's windings. As used herein, an SMC is any motor controller adapted to control the operation of the motor, including acceleration, run, and deceleration, which includes controlling the speed, position, and/or torque of the motor, as would be known to one skilled in the art. One such example of an SMC is available from Rockwell Automation in Milwaukee Wis.

Figure 1:
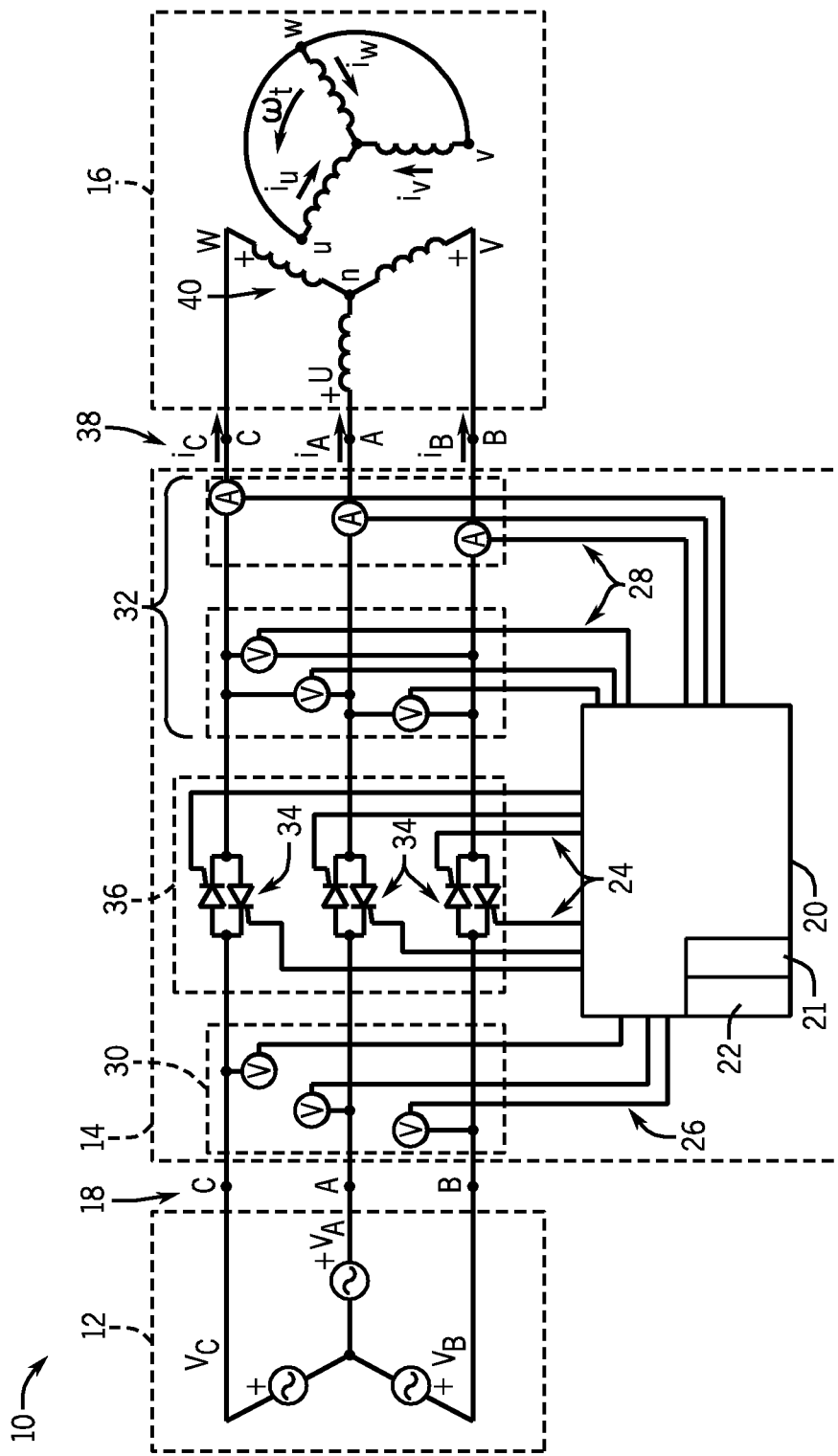
FIG. 1 is a schematic view of an exemplary induction motor system according to embodiments of the present invention.

Referring initially to FIG. 1, an exemplary motor control system 10 generally includes an input power source 12, a smart motor controller (SMC) 14, and a motor 16. The input power source 12 is selected according to the type of motor 16 used and may be any suitable power source known to one skilled in the art. In the exemplary motor control system 10, the input power source 12 provides a connection to an alternating current (AC) three-phase utility voltage, although application of the present embodiments is not limited to three-phase applications. Input leads 18 connect the SMC 14 to the input power source 12.

The SMC 14 typically includes a processor 20 and a memory storage device 22. The processor 20 executes a program 21 stored in the memory storage 22 to provide at least one control signal 24 in response to at least one input signal 26 and/or feedback signal 28. As would be known to one skilled in the art, an input voltage sensing section 30 may generate the input signals 26, providing the processor 28 with magnitude and phase angle data corresponding to the input voltage. A feedback section 32 may generate feedback signals 28, which may provide the processor 28 with current and/or voltage signals output to the motor 16. The control signals 24 may be used to selectively energize one or more switching devices 34, such as solid-state components, e.g., one or more silicon-controlled rectifiers (SCRs), in the switch block 36 to regulate the current and/or voltage output to the motor 16. Motor leads 38 connect the motor 16 to the SMC 14.

As described further below, the illustrated SMC 14 is capable of controlling various rotational aspects of motor operation in a first operation mode, such as speed and position, by selectively energizing the one or more switching devices 34. In applications where an SMC is used to control the rotation of the motor, the SMC can be used to control the heating of the motor windings directly in a second operation mode. Embodiments of the invention provide the ability to use the SMC 14 to apply small current levels through the motor's windings 40 to provide a means of controlling motor temperature and moisture levels in the second operation mode. The ability of the SMC to control motor winding heating allows the SMC to replace other known separate devices used to heat motor windings. By applying a controlled current level for a controlled time period, the level of heating can be controlled. This eliminates the need to provide an independent motor winding heater, and thus can save space and operating costs for the user.

Figure 2:
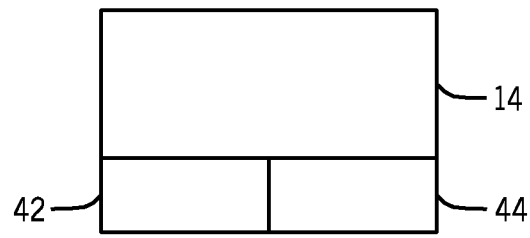
FIG. 2 is a block diagram showing an example of inputs used to enable embodiments of the present invention.

Referring to FIG. 2, in some embodiments, the SMC 14 may provide an adjustable or non-adjustable heating level input 42 for the user to set a heating level and/or a heating period to be used to heat the motor windings. The heating level input 42 may comprise a built-in keypad, with or without a display, or input 42 may comprise an optional human interface module, as would be known to one skilled in the art. This heating level can be maintained for a user-defined time period. In the same or other embodiments, the heating level can be maintained while a terminal block input 44 is active. The SMC may conduct current through one or more of the motor windings 40 during these periods if either condition is true.

The level of the heating current may be proportional to the heating level set by the user. The SMC may alternately conduct current through the windings 40 one winding at a time so that the heating effect may be generally even in both the motor 16 and the SMC 14 itself.

A firing pattern, discussed below, may be configured to avoid rotation of the motor. An alternate method may including using a slow speed algorithm at low frequencies to rotate through the phases. In this method, there may be minimal positive torque. With the levels of current required to heat the motor, this would not likely cause the motor to rotate.

Figure 3:
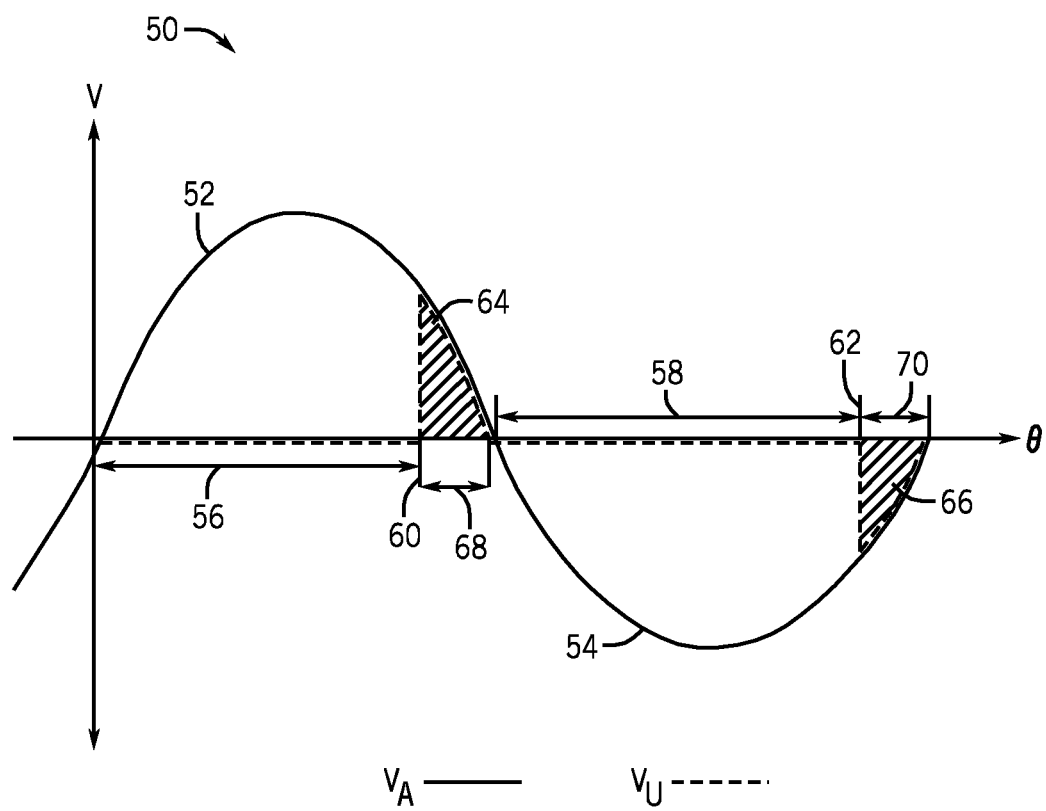
FIG. 3 is a graph showing an example of a single cycle for one phase of input and output voltage waveforms $V_A$ and $V_U$ through a portion of the induction motor system of FIG. 1, according to embodiments of the present invention.

In operation, the SMC 14 controls the motor 16 by selectively connecting the motor 16 to the input power source 12. Referring to FIGS. 1 and 3, operation of a single phase of the SMC 14 over one electrical cycle 50 is shown. The SCR pairs 34 work together to enable conduction during each half cycle of the input voltage, one SCR selectively conducting during the positive half cycle 52, and the other SCR selectively conducting during the negative half cycle 54. Each SCR remains in a normally off state, represented by time intervals 56 and 58, preventing conduction from the input power source 12, represented by phase voltage $V_A$, to the motor 16, represented by phase voltage $V_U$. Control signal 24 is used to turn on each SCR, for example at time 60 during the positive half cycle 52, and at time 62 during the negative half cycle 54. Once enabled, the SCR will remain on until the voltage across the SCR reverses polarity, reverse biasing the SCR. As a result, once the SCR is turned on, it will continue conducting for the remainder of each half cycle. The shaded portions, 64 and 66, indicate the time during which an SCR is conducting.

The electrical angle of the input voltage corresponding to the point at time, 60 or 62, at which each SCR is switched on is known as the conduction angle. The time interval, 68 or 70, during which the SCR remains on is known as the conduction interval. Although, the duration of the conduction intervals, 68 and 70, for each of the positive and negative half cycles, 52 and 54, are often the same, the duration of each conduction interval, 68 and 70, is independently controlled and may vary from the positive to the negative half cycle, 52 or 54. When full voltage is desired, each SCR is enabled at the start of the half cycle and conducts throughout the entire half cycle. Optionally, full conduction may be achieved by including a bypass contactor, not shown, in parallel to each SCR pair 34, which can be energized to directly connect the input voltage, $V_A$, to the output voltage, $V_U$.

As seen in FIG. 3, within a single firing opportunity, a small firing period 68 can be generated in the firing pattern, resulting in a low amount of current conduction relative to the motor's normal operating current. As described above, the amount of current conducted is controlled by the position within the power cycle the SCR is gated on. In some embodiments, this relatively small firing period and resultant current level may be controlled by the heating level input 42 parameter.

The firing pattern used during the motor winding heating is not the pattern used during normal SMC operation, where the SMC is controlling operation of the motor. If the firing pattern used during normal SMC operation were used, it may result in some motor rotation, especially if the heating level were to be set too high and there is no load on the motor. Instead, the firing pattern preferably includes a predetermined pattern such that the motor 16 does not rotate. Two examples of predetermined firing patterns according to embodiments of the invention are discussed below.

Figure 4:
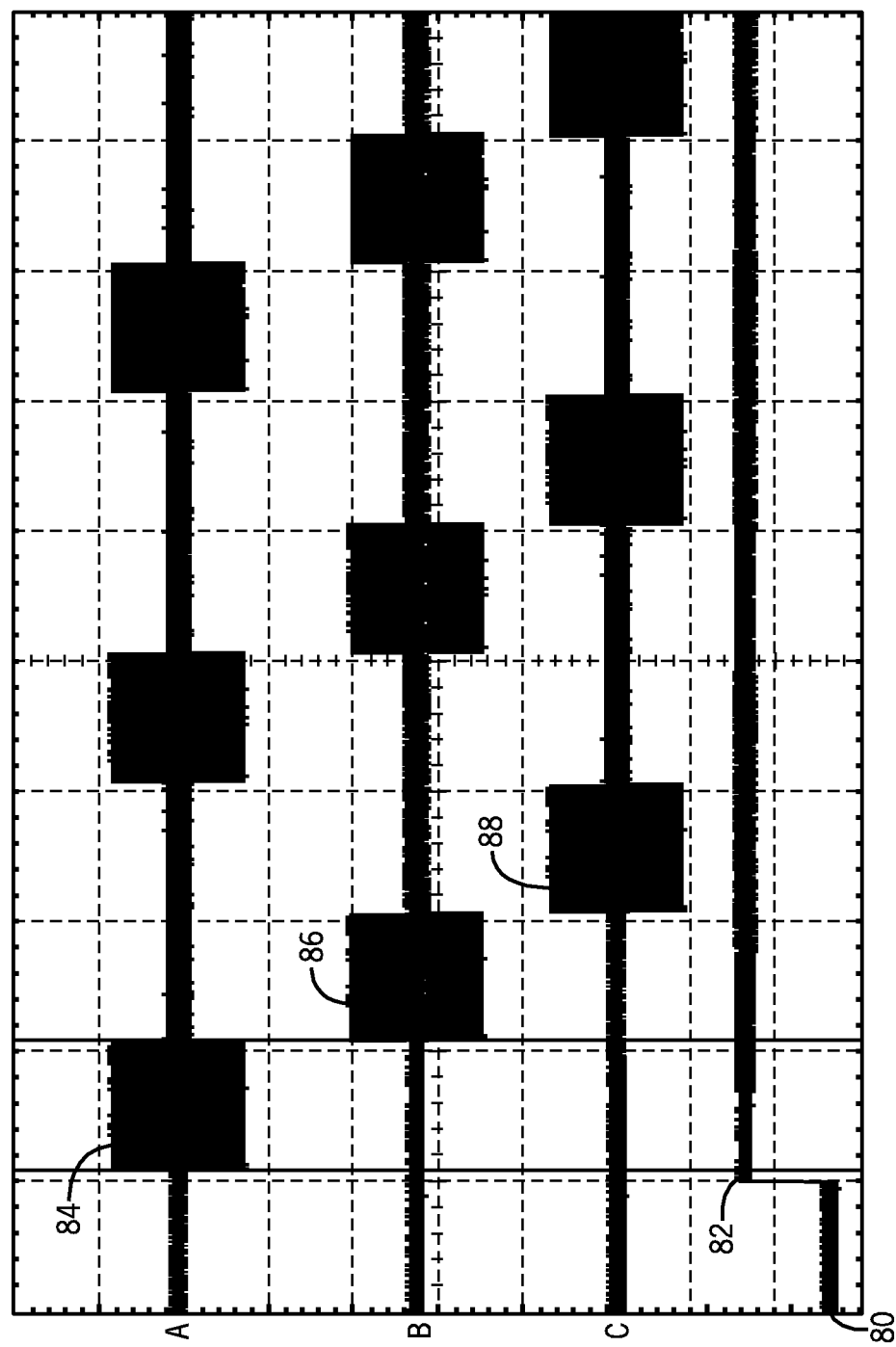
FIG. 4 is a graph showing waveforms of a firing pattern according to embodiments of the present invention.

Referring to FIG. 4, in some embodiments, the firing pattern may be gated only on a single phase at a time. It is to be appreciated that in a WYE connected motor, conduction will actually occur through two phases due to the motor winding connection. As can be seen, heating input 80 is first enabled at 82. Heating input 80 may comprise heating level input 42 and/or terminal block input 44, for example, although other inputs are contemplated. After input 80 is enabled, the firing pattern is gated on phase A at 84. After a predetermined period of time, the gating is switched to a second phase B at 86, and eventually to a third phase C at 88, at which time the sequence may be repeated. In some embodiments, the gating pattern may be applied to all phases simultaneously. In some embodiments, each phase may be enabled for about one second, or more or less, before the subsequent phase is enabled. In some embodiments, the one second time period may be fixed. In other embodiments, the amount of time each phase conducts may be set by the user, and may vary between phases.

In some embodiments, the firing pattern may comprise one or more predetermined slow speed patterns available within the SMC 14. In these embodiments, a gating sequence may be generated that may result in a known frequency, such that even if the motor were to rotate, the frequency would be limited by the applied signal. For example, a very low frequency such as 0.1 Hz, or more or less, may be chosen. In these embodiments, the heating level input 42 may still be used to adjust the level of current for winding heating.

Figure 5:
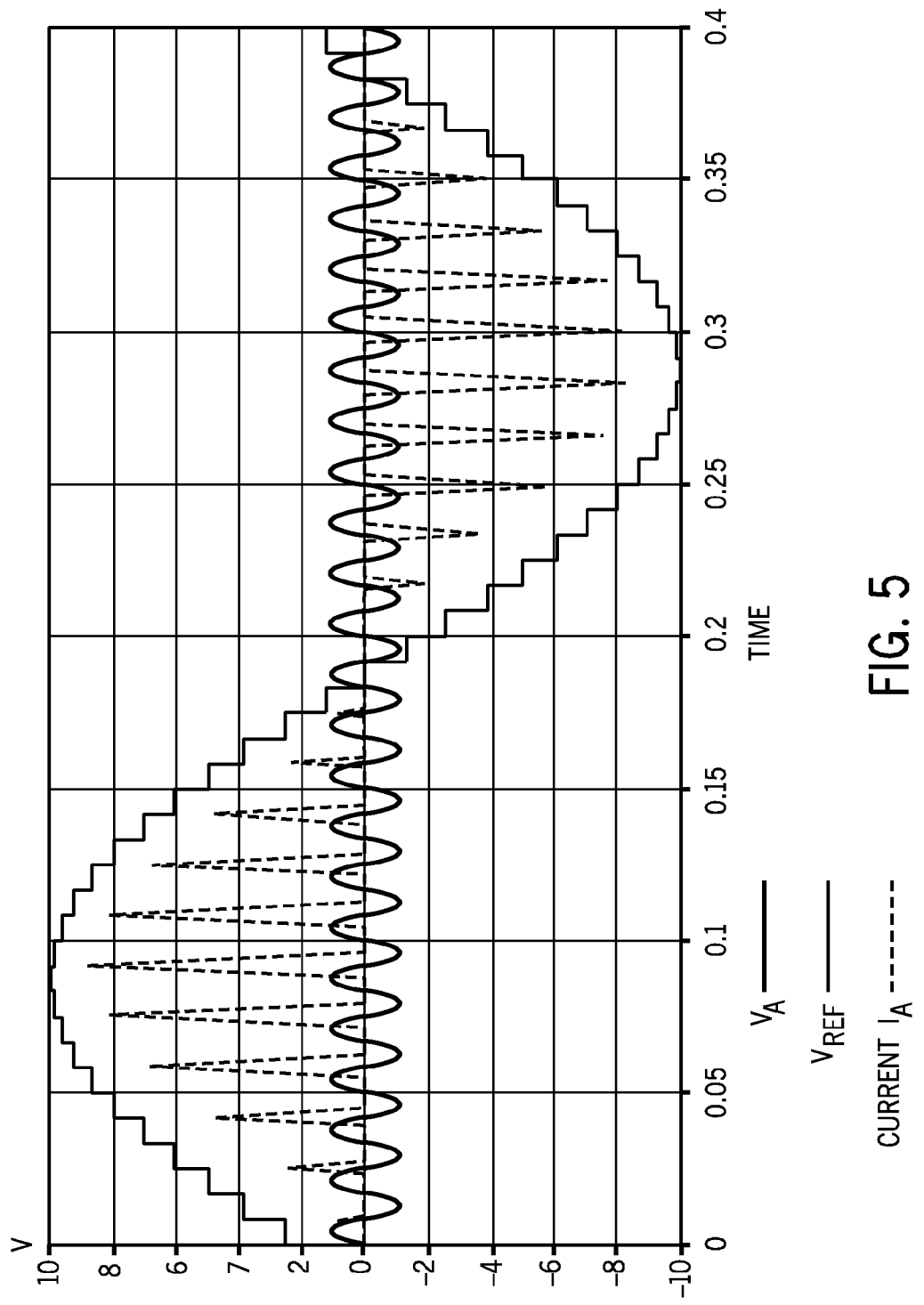
FIG. 5 is a graph showing an example of voltages and currents in the induction motor system of FIG. 1 during a plurality of cycles, according to embodiments of the present invention.

Referring to FIG. 5, an example of a slow speed gating pattern for one phase is shown. When using the slow speed gating pattern, the gating pattern may be applied to one phase at a time, or the gating pattern may be applied to all phases simultaneously. Specifically, FIG. 5 shows the relationship between a single phase voltage $V_A$, the phase current $I_A$, and a reference voltage $V_{REF}$ that modulates the conduction angle 68 (see FIG. 3). It should be understood that, in FIG. 5, to clearly illustrate their relationship over time, $V_A$ and $V_{REF}$ are not drawn to the same voltage scale, since the peak magnitude of $V_A$, in some embodiments, may be larger than $V_{REF}$. Because the reference voltage $V_{REF}$ controls the conduction angle 68, the frequency of the reference voltage $V_{REF}$ generally determines the motor speed, the amplitude of the reference voltage generally corresponds to motor torque, and the phase difference between the motor phase current and the reference voltage $V_{REF}$ determines the direction of the motor torque. Accordingly, motor rotation is determined by the rotation of the reference voltage $V_{REF}$.

As can be seen in a single cycle of the phase voltage $V_A$, the SMC 14 typically fires one of the two opposing SCRs in one of each SCR pair 34 per cycle of the phase voltage $V_A$. In some embodiments, which SCR is fired is generally determined by the sign of the reference voltage $V_{REF}$. Thus, the sign of the reference voltage $V_{REF}$ may determine both which SCR is fired and the half of the cycle of the phase voltage $V_A$ in which SCR is fired.

Over the cycle of the reference voltage $V_{REF}$, the reference voltage $V_{REF}$ modulates the phase current $I_A$. The larger of the magnitude of the reference voltage $V_{REF}$, the earlier the appropriate SCR is fired, and the earlier the firing, the larger the conducting angle 68 and the larger the phase current $I_A$. The reference voltage can be mapped to a conducting angle with a variety of techniques, including where the conduction angle 68 is proportional to the reference voltage $V_{REF}$, for example.

As previously identified, the motor winding heater function can be enabled using at least two methods. One method is to use an adjustable or non-adjustable heating level input 42 to the SMC 14 for the user to set a heating level. The heating level input may include a programmable heating level and a programmable time period to enable the winding heating. A second method is to use a terminal block input 44 to the SMC to enable the heating feature.

In some embodiments, when the motor is started, the heating feature may be enabled for the programmable time period entered by the user. After the heating time expires, the motor will be started in the programmed starting mode.

In other embodiments, a gating pattern that would normally be used to start the motor may also be used. In these embodiments, the heating level should be limited to a very low setting to avoid any potential motor rotation.

Figure 6:
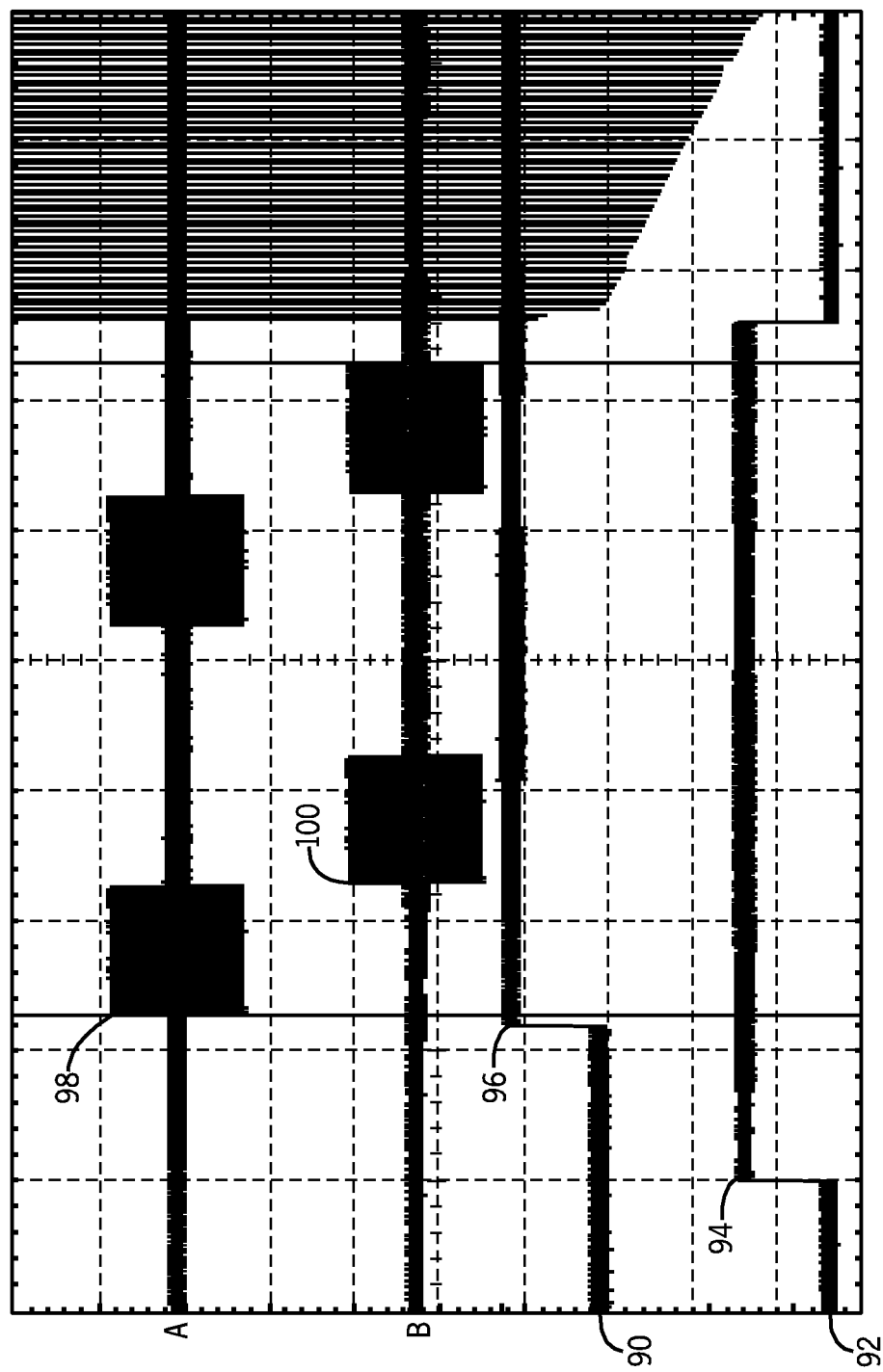
FIG. 6 is a graph showing waveforms of a firing pattern initiated with a user input, according to embodiments of the present invention.

The user may also access the terminal block input 44, which may be configured as "motor heating," to determine how long the motor heating feature is enabled, as compare to a fixed time period. Referring to FIG. 6, for example, if the terminal block input 44 is active when a motor start command is issued to the SMC 14 to start the motor 16, the motor heating feature would be enabled. Waveform 90 is shown as the motor start command, and waveform 92 is shown as the terminal block input 44. As can be seen, with the terminal block input 44 active at 94, once the motor start command is active at 96, the firing pattern may be gated on phase A at 98. After a predetermined period of time, the gating may be switched to a second phase B at 100. The gating pattern may continue as shown and described with reference to FIG. 4. Holding the terminal block input 44 active for a shorter or longer period of time may be used to control the heating period.

In some embodiments, the motor heating feature may remain active until the terminal block input 44 is disabled, at which time the SMC 14 may start in the preprogrammed starting mode. In some embodiments, the use of the heating feature may be limited to when a start command has been issued to the SMC 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A motor winding heater comprising:
a motor controller configured to receive an alternating current (AC) power and transmit at least a portion of the AC power during a conduction interval of a cycle of the AC power to a motor, the motor including at least two motor windings;
the motor controller including a processor configured to control operation of the motor controller in a first operation mode and a second operation mode;
the motor controller further including a heating level input to the second operation mode, the heating level input to set at least one of a heating level and a heating period to control heating of the at least two motor windings, the heating level to control a level of heating current to the at least two motor windings;
wherein in the first operation mode, the motor controller operates to transmit a first AC power derived from the AC power to all of the at least two motor windings to cause the motor to rotate; and
wherein in the second operation mode, the motor controller operates to transmit a second AC power derived from the AC power to all of the motor windings, the second AC power transmitted at a lower frequency than the first AC power to heat the motor windings without causing the motor to rotate.

2. The motor winding heater according to claim 1, wherein the motor controller further comprises a silicon controlled rectifier (SCR) configured to conduct the AC power during the conduction interval.

3. The motor winding heater according to claim 1, wherein the motor is an induction motor.

4. The motor winding heater according to claim 1, wherein the input comprises a terminal block input.

5. The motor winding heater according to claim 4, wherein the second operation mode is enabled when the terminal block input is active.

6. The motor winding heater according to claim 1, wherein in the second operation mode, the motor controller transmits the second AC power to the motor windings to heat the motor windings only after a motor start command is issued to the motor controller.

7. The motor winding heater according to claim 1, wherein the second AC power transmitted to all of the at least two motor windings in the second operation mode is transmitted at a very low frequency in a range of 0 to 0.1 hertz to at least one of the at least two motor windings.

8. The motor winding heater according to claim 1, wherein the processor is configured to control operation of the motor controller in a third operation mode; and
in the third operation mode, the motor controller operates to transmit a third AC power derived from the AC power to at least one of the at least two motor windings to heat the at least one of the at least two motor windings without causing the motor to rotate.

9. The motor winding heater according to claim 8, wherein in the third-operation mode, the motor controller transmits the third AC power to one of the at least two motor windings at a time.

10. A motor controller comprising:
a processor configured to control operation of the motor controller to rotate a motor having at least two motor windings, and when not rotating the motor, the processor is configured to control operation of the motor controller to heat the motor;
the motor controller further including a heating level input to heat the motor, the heating level input to set at least one of a heating level and a heating period to control heating of the at least two motor windings, the heating level to control a level of heating current to the at least two motor windings;
wherein when the processor controls operation of the motor controller to rotate the motor, the processor controls operation of the motor controller to transmit a first AC power to all of the at least two motor windings to cause the motor to rotate;
wherein when the processor controls operation of the motor controller to heat the motor, the processor controls operation of the motor controller to transmit a second AC power to all of the motor windings having a frequency less than the first AC power, such that the frequency of the second AC power is sufficient to heat the motor without causing the motor to rotate; and an input to the motor controller, the input to control at least one of the level of the AC power to the motor and the duration of the AC power to the motor.

11. The motor controller according to claim 10, further comprising a first, second, and third SCR pairs, wherein each SCR pair is coupled to a first phase path, a second phase path, or a third phase path, respectively, the processor configured to energize at least one SCR in the SCR pairs according to a first reference voltage, a second reference voltage, or a third reference voltage, wherein the first reference voltage, the second reference voltage, and the third reference voltage vary generally sinusoidally.

12. The motor controller according to claim 10, wherein the motor is an induction motor, and the induction motor is coupled to the motor controller.

13. A method for heating a motor having at least two motor windings, the method comprising:

receiving an alternating current (AC) power and transmitting at least a portion of the AC power during a conduction interval of a cycle of the AC power to the at least two motor windings;

providing a motor controller including a processor configured for controlling operation of the motor controller in a first operation mode and a second operation mode:

the motor controller further including a heating level input to the second operation mode, the heating level input to set at least one of a heating level and a heating period to control heating of the at least two motor windings, the heating level to control a level of heating current to the at least two motor windings;

controlling operation of the motor controller in the first operation mode, such that the motor controller is transmitting a first AC power derived from the AC power to all of the at least two motor windings and causing the motor to rotate; and controlling operation of the motor controller in the second operation mode, such that the motor controller is transmitting a second AC power derived from the AC power to all of the motor windings, the second AC power being transmitted at a lower frequency than the first AC power and heating the motor windings without causing the motor to rotate.

14. The method according to claim 13, wherein the motor controller further comprises a silicon controlled rectifier (SCR) configured for conducting the AC power during the conduction interval.

15. The method according to claim 13, further including inputting to the motor controller a duration of the AC power to the motor windings.

* * * * *